April 3, 1962 A. J. FAILLIE 3,028,129
STREAM-LINED AIRCRAFT BODY
Filed Jan. 20, 1958 3 Sheets-Sheet 3

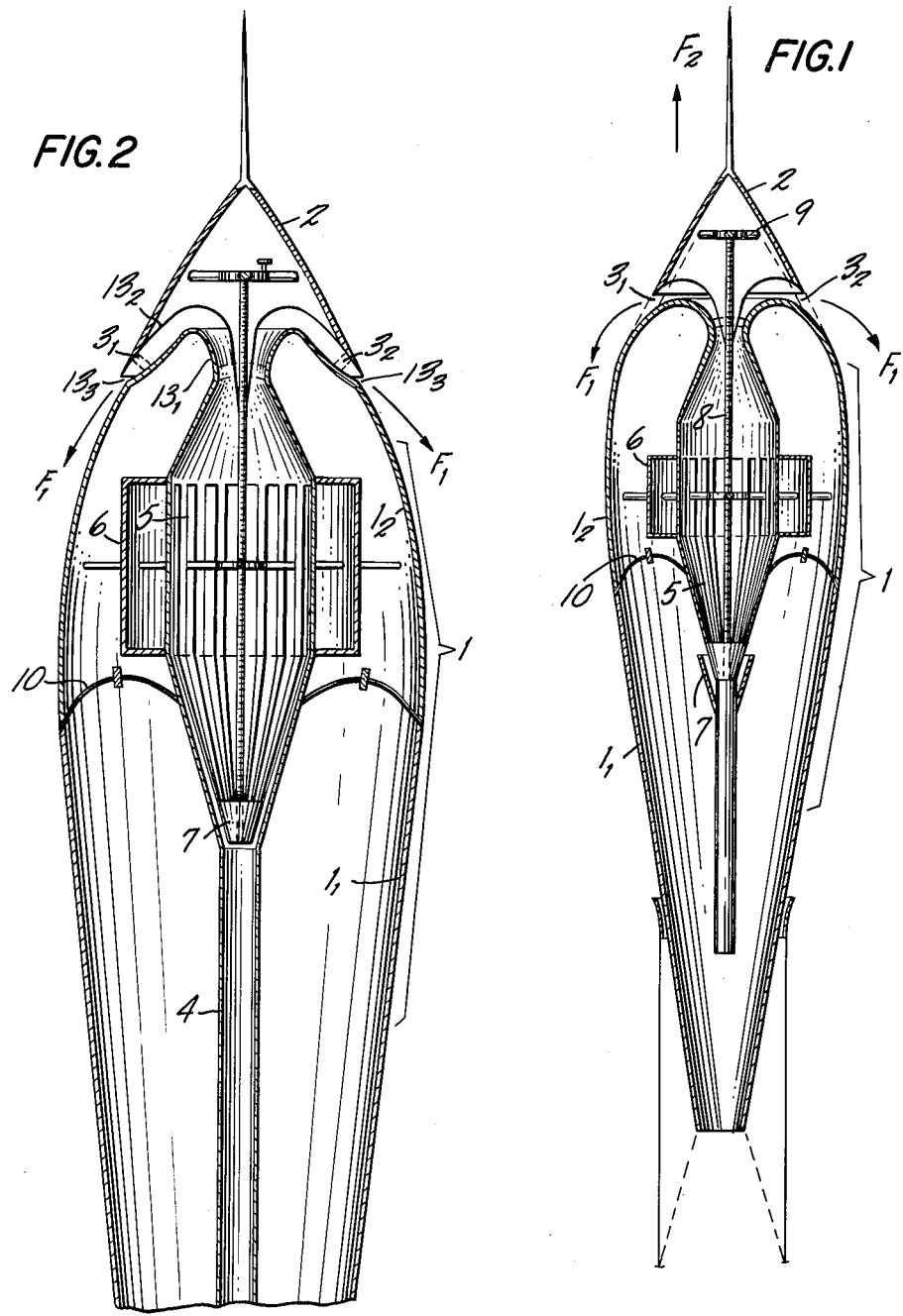

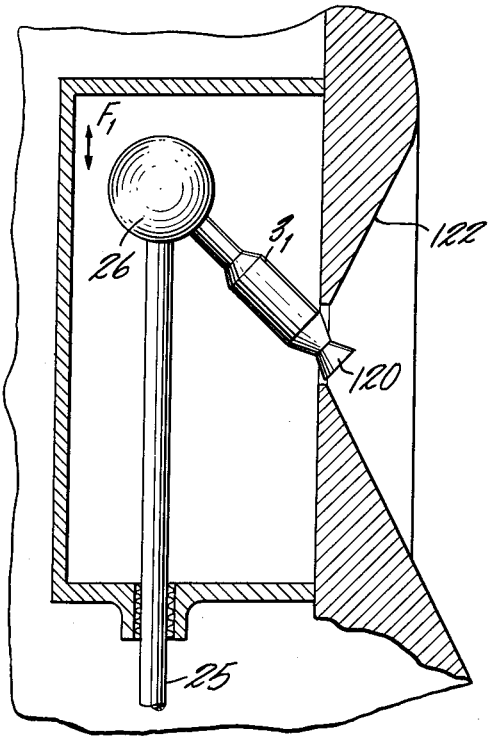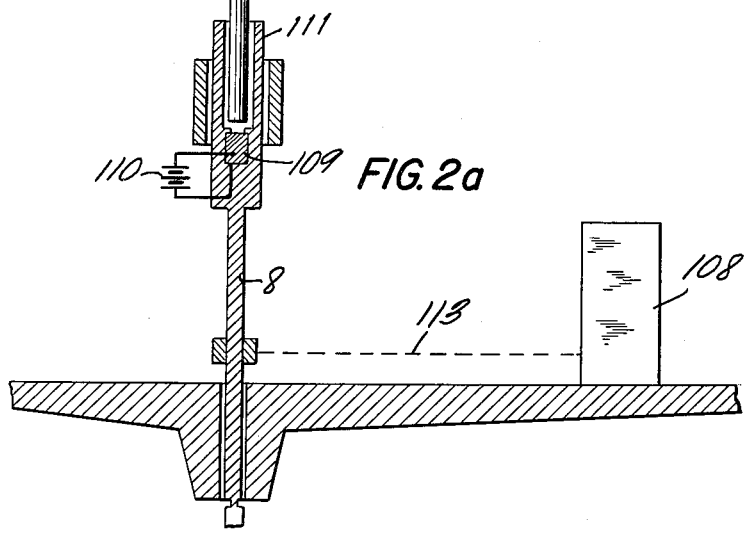

INVENTOR.
ANDRE JEAN FAILLIE
BY
ATTORNEY

United States Patent Office 3,028,129
Patented Apr. 3, 1962

3,028,129
STREAM-LINED AIRCRAFT BODY
André Jean Faillie, 37 Rue du Four, Paris, France
Filed Jan. 20, 1958, Ser. No. 709,885
Claims priority, application France Apr. 8, 1957
5 Claims. (Cl. 244—117)

The present invention relates to an improved stream-lined aircraft body, enabling a considerable reduction to be effected in heat giving off owing to the friction of ambient air molecules on the stream-lined aircraft body, so that said aircraft body can attain very high speeds and more particularly can exceed speeds corresponding to that known as "the heat wall."

The invention also has the purpose of braking the movement of the aircraft body, for example, during its downward course towards the ground.

The invention also has other purposes, which are hereinafter indicated:

Stream-lined aircraft bodies enabling the afore-mentioned objects to be achieved possess the characteristics arising out of the following description and more particularly the appended claims.

Stream-lined aircraft bodies according to the invention are shown by way of example in the accompanying drawings, in which:

FIGURE 1 shows in sectional elevation, a first embodiment of a stream-lined aircraft body;

FIGURE 2 shows in sectional elevation, a second embodiment of a stream-lined aircraft body;

FIGURE 2a is a view on an enlarged scale of part of the mechanism shown in FIGS. 1 and 2;

FIGURE 3a is a view on an enlarged scale of part of the mechanism shown in FIG. 3;

Figure 3:
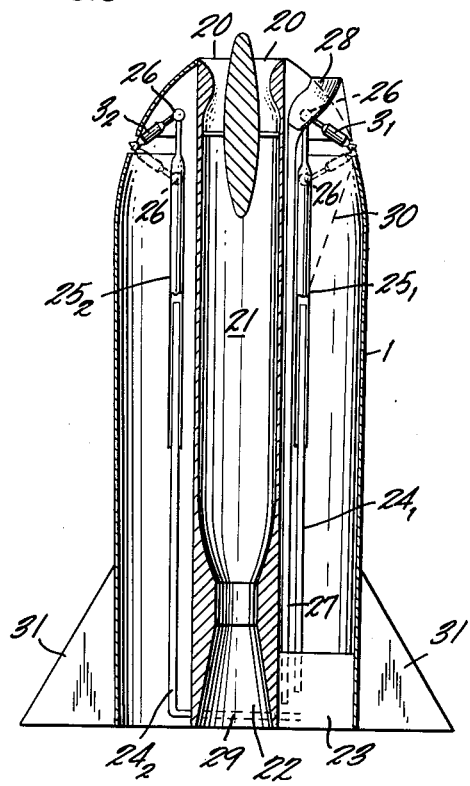
FIGURE 3 shows another stream-lined aircraft body in section elevation.

The stream-lined aircraft body consists of an outer casing 1 forming the fuselage, this outer casing 1 terminating in a pointed arch 2 made of a metal that affords particular resistance to high temperatures, such as zirconium. This streamlined aircraft body which forms a rocket comprises propelling members at its rear, such as a turbo-jet.

According to the invention, between the fuselage and the pointed arch passageways $3_1, 3_2, 3_3 \ldots 3_n$ are provided, by which a gaseous current is blown in the direction of the arrows $F_1$.

The direction and shape of the gaseous current are such that they appreciably assume the external shape of the fuselage. This gaseous current carries along in its movement the molecules situated in the immediate vicinity of the fuselage, so that a partial vacuum is created in the neighborhood of the external walls. This partial vacuum enables the friction of air molecules along the walls of the fuselage to be reduced, which prevents high temperatures from being reached that would otherwise occur if the stream-lined aircraft body such as a rocket traveled in the ambient air.

This gaseous current is set up by taking, through the piping 4, a certain quantity of gas discharged by the turbo-jet. This gas flows into a pre-heating chamber 5, whose body is surrounded by a heating member 6. At the exit of the heating chamber there are the passageways $3_1, 3_2 \ldots 3_n$ whose purpose is to increase the speed of the gases coming from the heating chamber, and to direct these gases according to the arrows $F_1$ as mentioned above.

Obviously, the sections of these passageways are studied in the usual manner to prevent load losses and more particularly whirlwind currents.

The device according to the invention also comprises means of regulating the quantity of gases driven along the walls. These means of regulation are formed as follows:

The gases coming from the turbo-jet and circulating in the piping 4, pass around the valve 7 and flow into the heating chamber. Valve 7 is integral with a threaded rod 8 and a controlling appliance, whose purpose is, by rotation of the threaded rod 8, to effect the raising of the valve 7, and the approach or removal of the pointed arch relatively to the end of the fuselage, which enables both the modifying of the entry section of the gases into the heating chamber 6, and the modifying of the section of the passageways $3_1, 3_2, 3_3 \ldots 3_n$. As shown in FIG. 2a the rod 8 is suitably formed in two separable parts, and the junction between the two parts suitably includes a sleeve 111 which is integral with the inward portion of threaded rod 8 and slidably receives the outward portion of rod 8. The sleeve is formed to hold an explosive charge 109 which is suitably ignited by any convenient igniting system indicated generally as the electric source 110. To rotate the rod 8 to displace the arch 2 and the valve 7 in one direction or the other to vary the passageways, there is suitably provided any convenient connection between a power source, indicated generally at 108, and the rod 8, as indicated by the broken line 113.

The device described above operates in the following manner:

In order to change the form of the passageways of the rocket illustrated in accordance with FIGS. 1 and 2, the drive means 108 is energized and through the drive connection 113 the threaded rod 8 is rotated in one direction or the other. The pointed arch 2 is thus displaced and this displacement changes the shape of the passageways.

In order to separate the pointed arch 2 from the rocket, it is merely necessary to ignite the explosive charge 109 by means of the ignition system 110 and the resulting explosion separates the arch from the body of the aircraft.

The stream-lined aircraft body described above comprises a number of particular arrangements, which are more particularly the following:

(1) The fuselage is made in two parts $1_1, 1_2$ connected at 10.

This arrangement has two advantages:

(a) Loading of the part $1_1$ is facilitated. It is only necessary to put the freight in through the upper round opening provided between the wall of the fuselage and the heating chamber.

(b) The part $1_1$ containing the freight to be protected from heat as well as the turbo-jet, can be released and parachuted.

(2) Around the heating chamber 5, the part $1_2$ can contain appliances such as measurement recording devices, bombs of all kinds, etc.

(3) The false pointed arch contains, for example, a finder head enabling the stream-lined aircraft body to be guided towards an objective. This finder head can also be released and provided with a parachute.

The current of gases enable a vacuum to be created around the fuselage wall, which can be reversed, and it is also possible to direct towards the passageways all of the gas produced by the turbo-jet, which enables the displacement of the rocket to be braked during its downward movement when the pointed arch has been released.

FIGURE 2 shows another embodiment of the stream-lined aircraft body which differs more particularly from that of FIG. 1 by the form of its passageways $3_1, 3_2, 3_3 \ldots 3_n$, these passageways having, at the exit from the heating chamber 5, a relatively narrow section $13_1$, which widens into $13_2$ and narrows at the exit at $13_3$.

The regulating of the current of the gases takes place in the same manner, by relative displacement of the valve 7 and the pointed arch 2.

When the pointed arch is in its lower position, the opening $13_3$ of each passageway $3_1, 3_2, 3_3 \ldots 3_n$ is closed.

When the pointed arch is cast off, the current of gases is sent towards the front of the rocket, which enables its movement to be braked, when it re-descends towards the ground.

Figure 4:
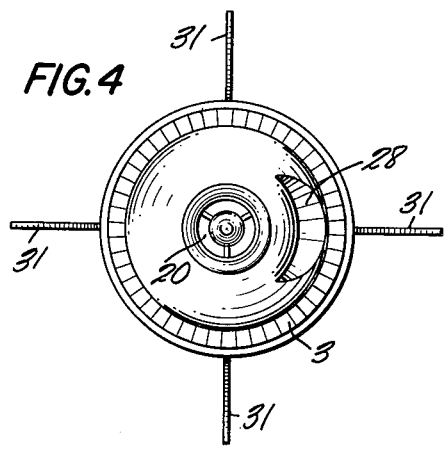
FIGURE 4 is a front view of the stream-lined aircraft body of FIG. 3.

The stream-lined aircraft body shown in FIGS. 3 and 4 consists of an outer casing forming the fuselage.

This stream-lined aircraft body comprises propelling organs such as a reaction motor comprising the air intake 20 placed in the front of the fuselage, the combustion chamber 21 and auxiliary members, and lastly the exhaust manifold 22 at the rear of the fuselage. This type of motor is conveniently designated a "stato-jet" since it involves no turbine.

Externally, the fuselage comprises ailerons, 31.

Passageways 3 are provided in front of the fuselage, arranged in the form of a crown.

These passageways are fed by the gaseous current taken from the gases of the stato-jet or by the air coming from a compressor 23 or by a mixture of air and gas produced by the stato-jet.

These passageways can be turned at will in various directions to enable:

(a) a gaseous current to be sent along the external walls of the fuselage towards the rear of the body;

(b) the discharge of the gaseous current towards the exterior along the axis of the fuselage and in the direction in which the body is moving, which enables the movement of the body to be bracked, for example, in its descent towards the ground.

The feed of the passageways 3 takes place through conduits $24_1$, $24_2$, etc. from the discharge opening of the air compressor 23.

Each of the conduits extends telescopically into a tube $25_1$, $25_2$ connected to the means forming the passageways 3.

At their junction with the passageways 3, these tubes are jointed for example by means of ball-and-socket joints 26 in such manner that the passageways can be directed either into the position shown in solid lines in FIG. 3, corresponding to a discharge of gaseous current towards the rear, along the outside walls of the fuselage, or into the position shown in dotted lines corresponding to the discharge of the gaseous current towards the front of the fuselage. The means for angular regulation control of the passageways $3_1$ and $3_2$ of the aircraft body in accordance with FIG. 3 is shown in more specific detail in drawing FIG. 3a.

Each passageway $3_1$ is slidably articulated at 120 in the expansion cone 122 of the exist of the passageway $3_1$.

This passageway is an integral part, at its other end, of a ball-and-socket joint 26 which can be displaced, according to the arrow $F_1$, towards the top or towards the bottom by similar movement of the rod 25. The device operates in the following manner:

In controlling the sliding towards the top or towards the bottom of the rod 25, the displacement towards the top or towards the bottom of the ball-and-socket joint 26 is brought about and consequently the rotation of the passageway $3_1$ around its point of articulation 120.

The telescopic connection of the conduits $24_1$, $25_1$, $24_2$, $25_2$ etc. enables the displacement movement to be absorbed at the hinge point of the passageways when their orientation is being regulated.

The air compressor is fed with outside air through a pipe 27 emerging in an air intake 28 at the front of the fuselage and having, for example, a crescent shape as shown in FIG. 4.

Some of the conduits 24 comprises a device for taking gases from the stato-jet.

The air or gaseous mixture going towards the passageways 3 can be heated by the heaters 30 before reaching the passageways. The reheating of the gaseous current has as its object to increase the active force of this gaseous current, and to send out a current which is sufficiently hot so that even after the expansion which is effected at the exit of the passageways, this gaseous current might still have a sufficient temperature in order to avoid any risk of frost.

Figure 5:
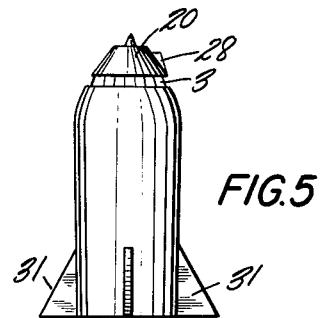
FIGURE 5 shows in elevation another stream-lined aircraft body having the characteristics of the body of FIGS. 3 and 4.

FIGURE 5 shows a particular embodiment of the body of FIGS. 3 and 4 in which the body of the streamliner aircraft comprises various enclosures, that can be separated or otherwise, in which freight, steering and telecontrol members, measuring devices, etc., can be placed.

The base of the body comprises accelerators for launching boosters intended successively to impart a speed of Mach M to the stream-lined aircraft, for which the stato-jet is regulated. A retractable false pointed arch can be placed at the front of the body for preventing retarding initial suction.

What I claim is:

1. In a stream-lined aircraft body, motive means operating by producing hot gas, passageways in the front of the aircraft body, means for sending a gaseous current into said passageways which direct said current along the outside walls of said aircraft body, after increasing the kinetic energy of the gaseous current owing to the shape of the passageways, and means for regulating the openings of the passageways to direct said gaseous current selectively forwardly and rearwardly relatively to the direction of displacement of the aircraft body, said passageways and the said motive means being so disposed that the flow and the active force of the gaseous current directed along the walls is sufficient that the partial vacuum created along the walls of the aircraft body effects a decrease in the evolution of heat by the friction of air molecules of ambient air on the stream-lined aircraft body, so that said aircraft body can attain very high speeds, particularly speeds exceeding the speed corresponding to the heat wall.

2. In a stream-lined aircraft body, motive means operating by producing hot gas, passageways at the front of the aircraft body, means for supplying said passageways with a gaseous current, said passageways and the said motive means being so disposed that the flow and the active force of the gaseous current directed along the outside walls of said body is sufficient that the partial vacuum created along the walls of the aircraft body effects a decrease in the evolution of heat by the friction of air molecules of ambient air on the stream-lined aircraft body, so that said aircraft body can attain very high speeds, particularly speeds exceeding the speed corresponding to the heat wall, means for regulating the orientation of said passageways so that the gaseous current supplying said passageways is discharged towards the outside parallel to the displacement direction of the aircraft body according to the axis of the aircraft body whereby the movement of the aircraft body may be braked.

3. In a stream-lined aircraft body having a front wall and a pointed arch and a fuselage provided with a front wall, motive means operating by producing hot gas, passageways at the front of the aircraft body between the front wall of said body and the pointed arch, means for sending a gaseous current into said passageways, said passageways and the said motive means being so disposed that the flow and the active force of the gaseous current directed along the outside walls of said body is sufficient that the partial vacuum created along the walls of the aircraft body effects a decrease in the evolution of heat by the friction of air molecules of ambient air on the stream-lined aircraft body, so that said aircraft body can attain very high speeds, particularly speeds exceeding the speed corresponding to the heat wall, means for separating the pointed arch from the aircraft fuselage, so that the gaseous current coming from the passageways is discharged outside parallel to the displacement direction of the aircraft body according to the axis of the body, which enables the movement of the aircraft body to be braked.

4. In a stream-lined aircraft body, motive means operating by producing hot gas, passageways at the front of the aircraft body, means for supplying said passageways with a gaseous current, and ball-and-socket joints on which the passageways can rotate, so that the orientation of said passageways can be regulated at will so that the latter discharge the gaseous current selectively towards the rear along the outside walls of the aircraft body, for diminishing friction by the ambient air, and towards the front for braking the movement of said aircraft body, said passageways and the said motive means being so disposed that the flow and the active force of the gaseous current directed along the walls is sufficient that the partial vacuum created along the walls of the aircraft body effects a decrease in the evolution of heat by the friction of air molecules of ambient air on the stream-lined aircraft body, so that said aircraft body can attain very high speeds, particularly speeds exceeding the speed corresponding to the heat wall.

5. In a stream-lined aircraft body, motive means operating by producing hot gas, passageways at the front of the aircraft body, means for supplying said passageways with a gaseous current, said last-named means being formed for each passageway by pipings consisting of two tubes mounted telescopically, and ball-and-socket joints connecting the passageways to the pipings for the gaseous current, said passageways and the said motive means being so disposed that the flow and the active force of the gaseous current directed along the walls is sufficient that the partial vacuum created along the outside walls of the aircraft body effects a decrease in the evolution of heat by the friction of air molecules of ambient air on the stream-lined aircraft body, so that said aircraft body can attain very high speeds, particularly speeds exceeding the speed corresponding to the heat wall.

References Cited in the file of this patent

UNITED STATES PATENTS

| | | |
|---|---|---|
| 1,887,148 | De Ganahl | Nov. 8, 1932 |
| 2,270,912 | Theodorsen | Jan. 27, 1942 |
| 2,478,792 | Trey | Aug. 9, 1949 |
| 2,801,829 | Taylor | Aug. 6, 1957 |

FOREIGN PATENTS

| | | |
|---|---|---|
| 7,919 | Great Britain | May 25, 1894 |
| 506,007 | Great Britain | May 22, 1939 |